(12) United States Patent
Gosselin et al.

(10) Patent No.: US 7,086,307 B2
(45) Date of Patent: Aug. 8, 2006

(54) PARALLEL CONTROL ARM WITH TWO BRANCHES

(75) Inventors: Florian Gosselin, Fontenay aux Roses (FR); Alain Riwan, L'Hay les Roses (FR)

(73) Assignee: Commissariat a l'Enegie Atomique, Paris (FR)

( * ) Notice: Subject to any disclaimer, the term of this patent is extended or adjusted under 35 U.S.C. 154(b) by 0 days.

(21) Appl. No.: 10/276,415

(22) PCT Filed: May 17, 2001

(86) PCT No.: PCT/FR01/01511

§ 371 (c)(1),
(2), (4) Date: Nov. 12, 2002

(87) PCT Pub. No.: WO01/87547

PCT Pub. Date: Nov. 22, 2001

(65) Prior Publication Data

US 2003/0151379 A1    Aug. 14, 2003

(30) Foreign Application Priority Data

May 18, 2000    (FR) .................................. 00 06364

(51) Int. Cl.
*B25J 17/00* (2006.01)

(52) U.S. Cl. .............................. 74/490.06; 74/490.05; 901/21

(58) Field of Classification Search ............. 74/490.01, 74/490.03, 490.05, 490.06; 901/14, 15, 21, 901/23, 30
See application file for complete search history.

(56) References Cited

U.S. PATENT DOCUMENTS

| | | | | |
|---|---|---|---|---|
| 4,610,598 A | * | 9/1986 | Hamada et al. | 414/744.5 |
| 4,976,582 A | * | 12/1990 | Clavel | 414/729 |
| 5,207,114 A | * | 5/1993 | Salisbury et al. | 74/479.01 |
| 5,333,514 A | * | 8/1994 | Toyama et al. | 74/490.06 |
| 5,656,905 A | * | 8/1997 | Tsai | 318/568.21 |
| 5,817,084 A | * | 10/1998 | Jensen | 606/1 |
| 5,931,832 A | * | 8/1999 | Jensen | 606/1 |
| 6,047,610 A | | 4/2000 | Stocco et al. | 74/479.01 |
| 6,371,952 B1 | * | 4/2002 | Madhani et al. | 606/1 |
| 6,425,303 B1 | * | 7/2002 | Brog.ang.rdh et al. | 74/490.03 |

OTHER PUBLICATIONS

Hiroo Iwata, "Pen-based Haptic Virtual Environment", Sep. 18, 1993, IEEE, pp. 287-292.

\* cited by examiner

*Primary Examiner*—David Fenstermacher
(74) *Attorney, Agent, or Firm*—Thelen Reid & Priest LLP

(57) ABSTRACT

The robot arm is composed of two parallel branches (2, 3) formed from a reduced number of segments (5, 6, 7) and connected to each other by a wrist (5) through a wrist holder (8), the directions of which are kept approximately constant by transmissions (12 to 16). The working space of this control arm is large and it is free of any kinetic singularities except at the end positions, and good decoupling of translation and rotation movements is achieved.

21 Claims, 2 Drawing Sheets

PARALLEL CONTROL ARM WITH TWO BRANCHES

CROSS-REFERENCES TO RELATED APPLICATIONS

The present application claims priority from French Patent Application No. 00 06364, filed May 18, 2000.

FIELD OF THE INVENTION

The present invention relates to robotic arms. More particularly, the present invention relates to a control arm comprising two branches in parallel.

BACKGROUND OF THE INVENTION

The function of the control arms is to transfer movements applied to them by an operator into control instructions for an instrument or a system, usually a remote robot called a slave arm or a computer simulation. When the control arm is provided with a sufficient number of degrees of freedom, the operator can control it in translation and in rotation in space.

There is a wide variety of forms of anus used in robotics. In the most traditional form, they are composed of a chain of segments connected to each other by articulations or sometimes by other types of joints; this arrangement is called "in series". But there are disadvantages with this type of arm whenever there are a large number of segments.

Thus, there is play at joint mechanisms which accumulate and eventually produce a significant imprecision on the position of the free end of the arm. Furthermore, the motors that normally need to be added to the arm to control the states of the joints in order to modify their configuration or to hold them in a fixed position regardless of the external forces applied to them, and which are frequently the heaviest part of the arms, cause excessive bending moments that can make it necessary to reinforce the structure of the segments and therefore further increase the weight of the arm, making it inconvenient to manipulate. It was proposed to displace the motors onto the fixed base on which the arm is mounted, but this solution would require installing transmissions between the motors and the joints controlled by them, which is not always possible and in any case contributes to making the arm complex.

This is why in the more recent history of robotics, designers have been interested in constructions using several (two or more) arms in parallel, in which the distal ends are connected together. For a similar number of degrees of freedom, the branches of arms built in this way are less complex than in robots in series, which significantly attenuates the disadvantages of the imprecision in the position of the arm and the weight of the branches. However, there are specific limitations with this type of robot. They may thus be difficult to control to a given state, due to the fact that their kinetic complexity is greater; their working range is usually smaller than the working range of arms in series, since it is limited by the working range of different branches in parallel and by collisions between segments of the different branches; finally, a fault correlated to the previous fault is that the number of singularities, which are configurations that should be avoided since the robot may be subjected to uncontrolled movements at these points, is generally greater. Singularities correspond to local disappearances of degrees of freedom or uncontrolled movements. Singularities corresponding to uncontrolled movements are specific to parallel robots, but all singularities restrict the usage range of the arm. This disadvantage is more pronounced with master arms, which are not designed to apply repetitive movements or movements known in advance and that are controlled by hand without thinking about singularities, and which therefore may occur unexpectedly. This is why they must be limited, while transferring them to the ends of the working range. It is concluded from these various remarks that arms in parallel are attractive as master arms due to the convenience in manipulating them, but in reality their specific defects make most of them inappropriate for this application. The invention deals with a particular arrangement of arms in parallel, for which the main advantages are a significant reduction in singularities and considerable ease of control, which means that the movement required to reach a required state can be imposed without difficulty.

BRIEF SUMMARY OF THE INVENTION

These objectives are achieved with a control arm comprising two branches extending between a common base and a common wrist, characterized in that it comprises wrist holders arranged between the wrist and the branches, means of keeping constant angles between the wrist holders and fixed planes, such that the wrist holders make it possible to separate the elements responsible for the translation control from the elements responsible for controlling degrees of freedom of rotation, within each of the two branches. This separation in itself contributes to reducing singularities. The document in prior art closest to this concept is possibly an article by Iwata entitled "Pen-based haptic virtual environment" (IEEE-ICRA 1993, p. 287 to 292) that describes a parallel robot with two branches connected at a wrist but without a wrist holder according to the invention. This arm comprises singularities.

Branches advantageously have segments articulated to each other, to the corresponding wrist holders and to a portion of the base through three parallel axes; this portion of the base is then advantageously installed free to rotate on a fixed portion of the base around an axis orthogonal to the previous parallel axes, which confers three degrees of freedom in translation of the branches at the wrist holder; the wrist is then composed of articulated portions, so that there are two or three degrees of freedom in rotation. The means of keeping the angles mentioned above between the wrist holders and the fixed planes constant may comprise transmissions extending on the branches, and more precisely pulleys located on the successive articulation axes of branch segments and a series of tensioned belts between the pulleys of the successive articulation axes; the pulleys are usually free to rotate, except for the last two pulleys which are fixed to the wrist holder and to an immobile structure fixed with respect to the fixed base or to the first body of each of the branches, respectively.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF THE INVENTION

Figure 1:
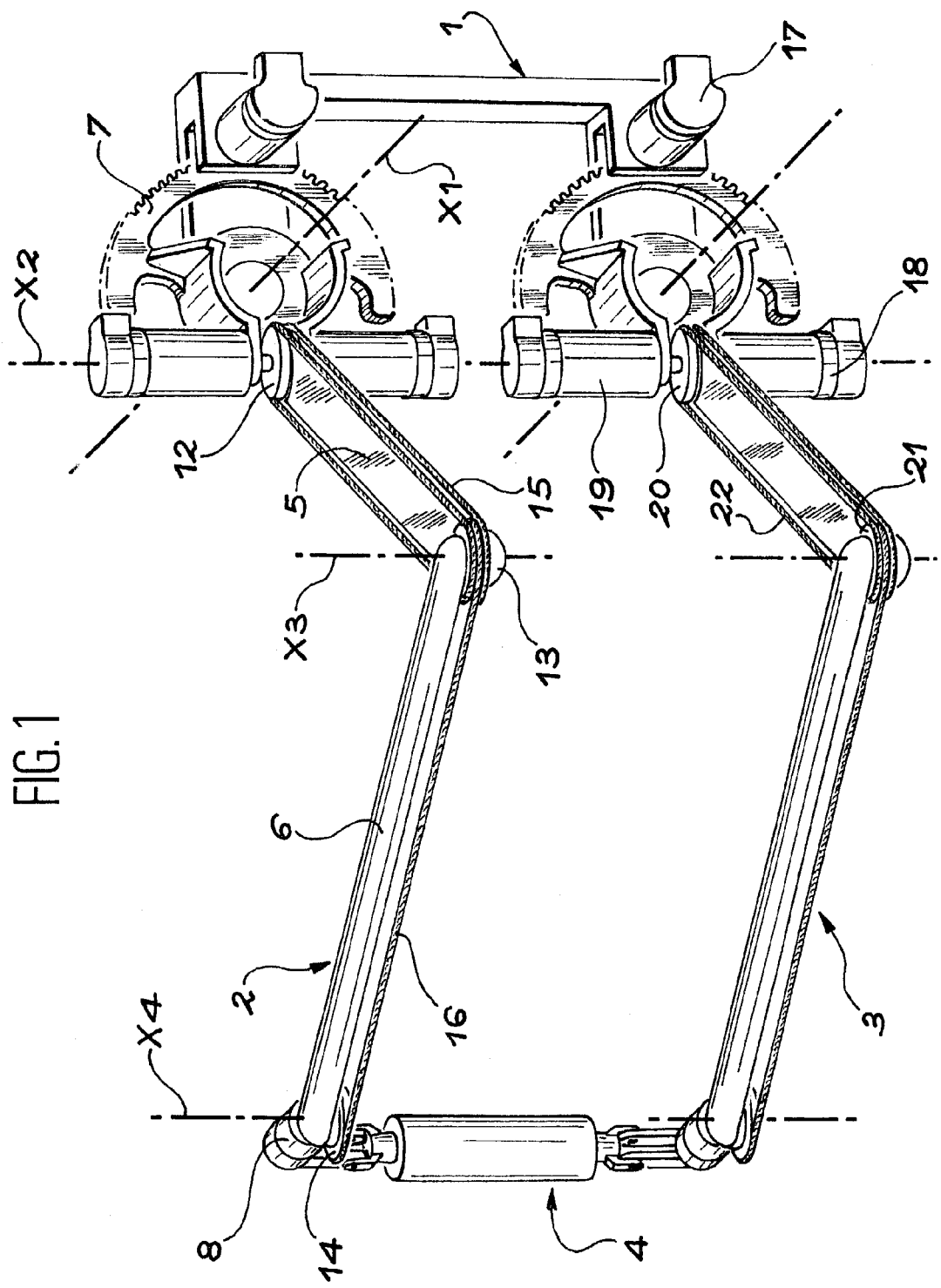
FIG. 1 is a diagram schematically illustrating an arm assembly in accordance with one embodiment of the present invention.
Figure 2:
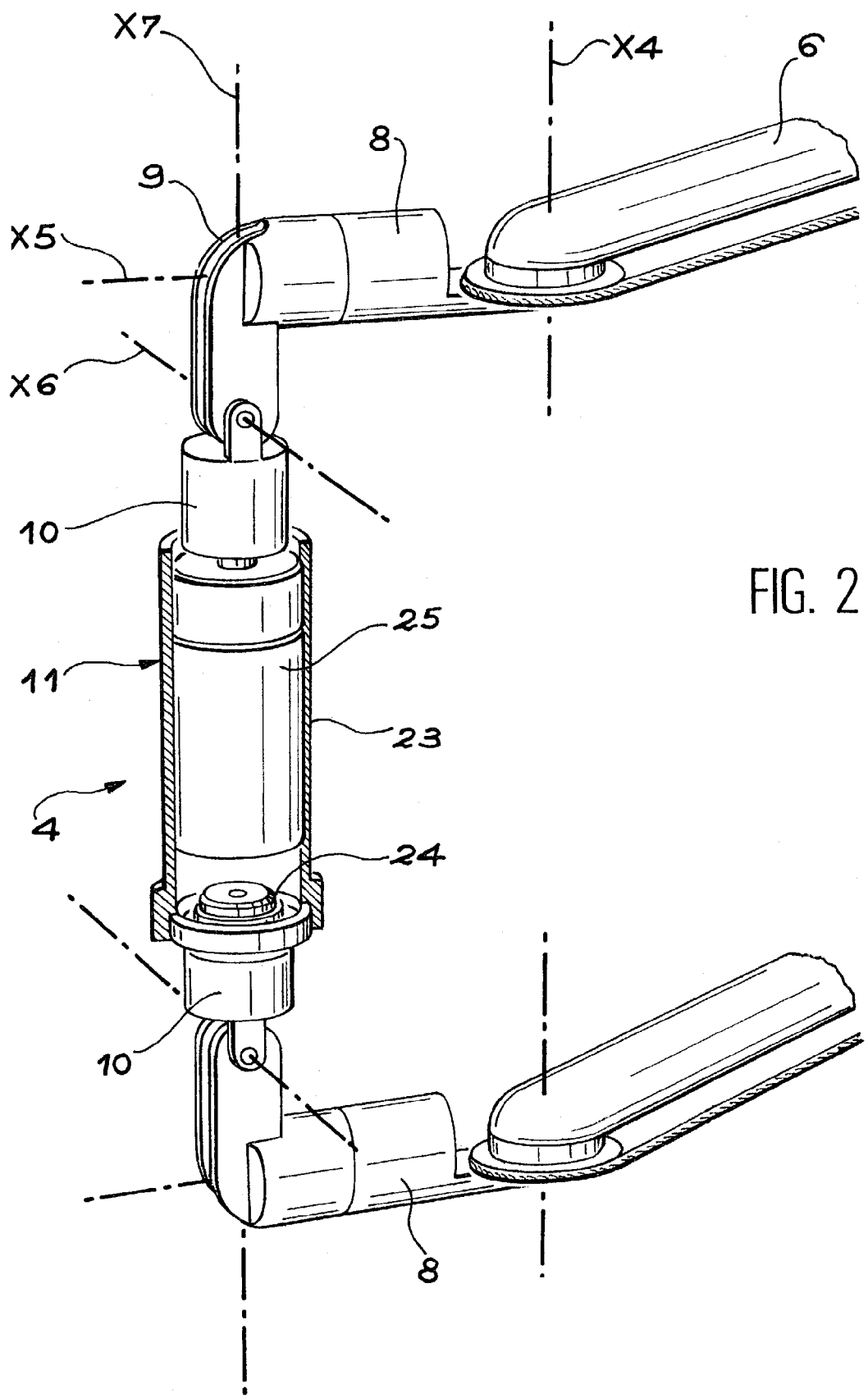
FIG. 2 is a diagram schematically illustrating a wrist of the arm assembly in accordance with one embodiment of the present invention.

With respect to FIGS. 1 and 2, the arm is installed on a fixed base 1 and comprises two arms 2 and 3 arranged in an arbitrary manner between this base 1 and a wrist 4 that connects them together. Advantageously, these two branches may be superposed. Advantageously, they may also be similar. In the reference configuration shown, in which the wrist 4 is perpendicular to them, the branches 2 and 3 are in parallel planes. Each of the branches comprises an arm segment 5, a forearm segment 6, and also an attachment body 7 forming a moving base connected to the fixed base 1 and a wrist holder 8 connected to the wrist 4. The attachment body 7 rotates about the base 1 about an X1 axis. The arm segment 5 is articulated to the attachment body 7 and to the forearm segment 6 by the X2 and X3 articulation axes respectively. Advantageously, these axes will be parallel to each other and perpendicular to the X1 axis. The distal end of the forearm segment 6 is articulated to the wrist holder 8 by an articulation axis X4 which will advantageously be parallel to the X2 and X3 axes. The wrist holders 8 comprise ends 9 rotating about an axis X5 coincident with a general direction of elongation of the wrist holder 8, end pieces 10 are attached to the ends 9 with the capability of rotating about themselves about X6 axis perpendicular to the X5 axis, and a handle 11 connects the end pieces 10 to each other, keeping them aligned with each other, while being able to rotate about an X7 axis coaxial to them. Advantageously, this axis is orthogonal to the previous pairs of X5 and X6 axes in the reference configuration. The handle 11 is free to pivot about the X7 axis without changing the distance between the X5 axes or the wrist holders 8, unlike the handle in the previous article which included a screw connection that could be the cause of singularities.

An essential element of the invention is that the wrist holders 8 and their X5 axes form a constant angle with fixed planes, in this case plans perpendicular to the X1 axis; if this angle is a right angle, the wrist holders 8 remain at a fixed orientation in space. This is achieved by means of a transmission comprising a holding pulley 12 coaxial with the X2 axis and fixed to the attachment body 7, a return pulley 13 coaxial with the X3 axis and free to rotate freely about segments 5 and 6, a holding pulley 14 coaxial with the X4 axis and fixed to the wrist holder 8, and two belts 15 and 16 tightened between pulleys 12 and 13, and between pulleys 13 and 14 respectively, thus forming a chain, for each of the branches 2 and 3. Regardless of the movement applied to segments 5 and 6, the action of the belts 15 and 16 holds the X5 axis in a direction identical to the plane formed by the segments, since the pulley 12 remains fixed.

Movements of the handle 11 are produced by movements of segments 5 and 6 and attachment bodies 7 about the X1, X2 and X3 axes. Translation movements are obtained by moving the wrist holders 8 of the two branches in the same direction, and rotation movements (except for rotation about the axis of the handle) are achieved by moving them in opposite directions. The result is that five degrees of freedom can be controlled by acting on the position of the two wrist holders 8 with motors on or close to the base. The branches 2 and 3 remain well separated from each other and do not come into collision except for very large inclinations of the handle. Furthermore, movement singularities can only occur at extreme tipping positions of the wrist 4.

We will now describe the means of actuating the arm. Motors are used to feedback forces felt at the slave arm or generated by a computer simulation, to the operator. These motors 17 are arranged on the fixed base 1 and help tilt the attachment bodies about the X1 axis by a gear, a belt or other transmission, motors 18 are placed on the X2 axes and help in tipping the segments of the arm 5 with respect to the attachment bodies 7, other motors 19 are also placed on the X2 axes but in reality are used to adjust the angles made between the X3 axis and the arm segment 5 and forearm segment 6, using a pulley 20 connected to their output spindle, a pulley 21 connected to the forearm segment 6 and a tensioned belt 22 between these pulleys. The pulleys 20 and 21 and the belt 22 may be replaced by any other appropriate device such as a connecting rod, which will lead to a parallelogram type of assembly well known to those skilled in the art.

There is no need to place a motor for the X4 axes which are controlled otherwise, for the X5 or X6 axes since rotations about these axes are derived only from movements at the ends of the forearm segments 6; but a motor 25 designed for use by the handle 11 may be added in order to control a pivoting degree of freedom about the X7 axis.

Advantageously, the motor 25 may be fixed to a gripping duct 23 on the handle 11 installed on end pieces 10 free to rotate about a bearing 24, while the output shaft from the motor 25 is connected to the opposite end piece 10. It may also be mounted on a moving base 7, but this requires a device for the transmission forces from the motor 25 to the handle.

Sensors such as angular position encoders are associated with the different motors to measure their movements and to indicate the state of the arm and imposed controls, but once again these techniques are known and will not be mentioned in this text. If a degree of freedom is superfluous, it is advantageous to manage without the pivot control of the handle 11 which is the most difficult to produce precisely and comfortably. In any case, the other motors are fixed on the fixed base 1 or the attachment body 7 supported directly by the base, so that their weight is not supported by segments 5 and 6, which may be fairly lightweight as a result.

Motors 18 and 19 controlling the arms 5 and the forearms 6 that are located along the X2 axis can be offset from the X2 axis if a reduction gear has to be added. They may also be installed on the fixed base 1 provided that a suitable transmission device is inserted as far as the X2 axis, but this device is not described in this document. The terminal device on the arm is not necessarily a handle, it may be a pen, a ball, pliers, etc., depending on the envisaged application, for example games, simulation devices, remote manipulation, remote operation or remote displacement for various industries.

The invention claimed is:

1. A control arm configured to transfer movement to a coupled device, the control arm comprising:
   two branches extending from a common base, each branch having portions moveable along a plane and rotatable about at least two parallel first axes;
   a common wrist;
   two wrist holders coupled to respective ends of the common wrist, each wrist holder extending along a second axis parallel to the plane and joined in an articulated manner to respective ones of the branches; and means for preventing the second axis of each wrist holder from moving out of the plane.

2. Control arm according to claim 1, characterized in that said means for preventing comprises a joint about which each wrist holder is coupled to its respective branch, wherein each wrist holder rotates about the joint about a third axis parallel to the first axis.

3. Control arm according to claim 1, further comprising transmissions including pulleys located on successive articulation axes segments of the branches, and tightened belts in series on pairs of successive articulation axes, one of said pulleys being a fixed pulley.

4. Control arm according to claim 1, characterized in that the branches are free to move such that they have three degrees of freedom of translation at the wrist holders, and in that the common wrist is comprised of articulated portions so as to have two or three degrees of freedom in rotation.

5. Control arm according to claim 4, characterized in that the portions of the common wrist are articulated about axes that are orthogonal to each other at a reference configuration.

6. Control arm according to claim 1, characterized in that the wrist is free to pivot about an axis perpendicular to the axes of the wrist holders without changing the distance between the wrist holders.

7. Control arm according to claim 1 further comprising a force feedback motor coupled to the common wrist.

8. Control arm according to claim 1, further comprising a force feedback motor installed on a portion of the base and means for transmission of force from the motor to the common wrist.

9. Control arm according to claim 1, characterized in that the branches comprise two segments articulated with each other, with a wrist holder and with a portion of the base through three parallel axes.

10. Control arm according to claim 1, comprising force feedback motors coupled to the base.

11. Control arm according to claim 9, characterized in that the said portion of the base is free to rotate about a fixed portion of the base about an axis orthogonal to the said three parallel axes.

12. Control arm according to claim 1, characterized in that the branches are of substantially equal length.

13. A control arm configured to transfer movement to a remotely coupled device, the control arm comprising:
two branches extending from a common base, each branch having portions moveable along a plane and rotatable about at least two parallel first axes;
a common wrist; and
two wrist holders coupled to respective ends of the common wrist, each wrist holder extending along a second axis parallel to the plane and joined in an articulated manner to respective ones of the branches at a third axis parallel to the two first axes, wherein the wrist holders rotate about the third axis and remain in the plane during rotation.

14. The control arm according to claim 13, wherein the branches are free to move such that they have three degrees of freedom of translation at the wrist holders, and in that the common wrist is comprised of articulated portions so as to have two or three degrees of freedom in rotation.

15. The control arm according to claim 14, wherein the portions of the common wrist are articulated about axes that are orthogonal to each other at a reference configuration.

16. The control arm according to claim 14, wherein the wrist is free to pivot about an axis perpendicular to the axes of the wrist holders without changing the distance between the wrist holders.

17. The control arm according to claim 13, further comprising a force feedback motor in the common wrist.

18. The control arm according to claim 13, further comprising a force feedback motor installed on a portion of the base and a device for transmission of force from the force feedback motor to the common wrist.

19. The control arm according to claim 13, wherein the branches include segments further comprising force feedback motors supported on the base and wherein the base comprises force feedback motors supported thereon.

20. The control arm according to claim 13, wherein the branches are of substantially equal length.

21. A robotic arm configured to transfer movement to a coupled device comprising:
a common wrist having two ends;
two branches extending from a common base, each branch oriented along a plane and having a first axis about which adjacent portions of the branch are rotatable; and
two wrist holders coupled to respective ends of the common wrist, each wrist holder coupled to its respective branch at a joint having a second axis parallel to the first axis, each wrist holder extending along the plane of its respective branch wherein the wrist holder rotates about the joint and remains in the plane.

* * * * *